(12) United States Patent
Shi et al.

(10) Patent No.: US 12,362,877 B2
(45) Date of Patent: Jul. 15, 2025

(54) INFORMATION PROCESSING METHOD, NETWORK DEVICE, AND USER EQUIPMENT

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 309 days.

(21) Appl. No.: 17/645,338

(22) Filed: Dec. 21, 2021

(65) Prior Publication Data

US 2022/0116177 A1    Apr. 14, 2022

Related U.S. Application Data

(63) Continuation of application No. PCT/CN2019/099528, filed on Aug. 6, 2019.

(51) Int. Cl.
*H04L 5/00* (2006.01)
*H04W 72/23* (2023.01)

(52) U.S. Cl.
CPC .......... *H04L 5/0048* (2013.01); *H04W 72/23* (2023.01)

(58) Field of Classification Search
CPC ... H04L 5/0048; H04L 5/0023; H04L 5/0055; H04L 5/001; H04L 5/0053; H04W 72/23;
(Continued)

(56) References Cited

U.S. PATENT DOCUMENTS

2018/0227777 A1 * 8/2018 Sun ................. H04L 5/0044
2019/0306847 A1   10/2019 Seo et al.
(Continued)

FOREIGN PATENT DOCUMENTS

CN     108092754 A    5/2018
CN     108540985 A    9/2018
(Continued)

OTHER PUBLICATIONS

3GPP TSG RAN WG1 #97 R1-1906236, Reno, USA, May 13-17, 2019, Source: ZTE, Title: Enhancements on Multi-TRP and Multi-panel Transmission, Agenda item: 7.2.8.2, Document for: Discussion and Decision. the whole document. 14 pages.
(Continued)

Primary Examiner — Chirag G Shah
Assistant Examiner — Joshua Smith
(74) Attorney, Agent, or Firm — PERKINS COIE LLP

(57) ABSTRACT

An information processing method, a UE, a network device, a chip, a computer-readable storage medium, a computer program product, and a computer program. The method comprises: a UE receives first downlink control information (DCI) used for scheduling first downlink data transmission (21). The first DCI is transmitted on a first control resource (CORESET) in a first CORESET group; and the first CORESET group comprises one or more CORESETs.

20 Claims, 5 Drawing Sheets

(58) Field of Classification Search
CPC . H04W 72/20; H04W 72/046; H04W 72/232; H04W 8/24; H04W 72/0453; H04W 72/0457; H04W 72/231
See application file for complete search history.

(56) References Cited

U.S. PATENT DOCUMENTS

| | | | |
|---|---|---|---|
| 2020/0196284 A1 | 6/2020 | Wang et al. | |
| 2021/0076324 A1* | 3/2021 | Kaikkonen | H04W 72/53 |
| 2022/0078766 A1* | 3/2022 | Li | H04W 72/23 |
| 2022/0231810 A1* | 7/2022 | Matsumura | H04L 5/0048 |
| 2022/0256522 A1* | 8/2022 | Matsumura | H04L 5/0048 |
| 2022/0264600 A1* | 8/2022 | Yuan | H04W 72/20 |
| 2022/0321303 A1* | 10/2022 | Matsumura | H04L 5/0035 |

FOREIGN PATENT DOCUMENTS

| | | |
|---|---|---|
| CN | 108781432 A | 11/2018 |
| CN | 109392112 A | 2/2019 |
| CN | 109392140 A | 2/2019 |
| CN | 109565390 A | 4/2019 |
| CN | 109699054 A | 4/2019 |
| CN | 109792745 A | 5/2019 |
| EP | 3609112 A1 | 2/2020 |
| JP | 2022547778 A | 11/2022 |
| WO | 2018130148 A1 | 7/2018 |
| WO | 2018145094 A2 | 8/2018 |
| WO | 2018208059 A1 | 11/2018 |
| WO | 2019029421 A1 | 2/2019 |
| WO | 2019095893 A1 | 5/2019 |
| WO | 2021007854 A1 | 1/2021 |

OTHER PUBLICATIONS

3GPP TSG RAN WG1 Meeting #97 R1-1906287, Reno, USA, May 13-17, 2019, Source: OPPO, Title: Enhancements on multi-TRP and multi-panel transmission, Agenda Item: 7.2.8.2, Document for: Discussion and Decision. the whole document. 11 pages.
3GPP TSG RAN WG1 #96bis Meeting R1-1905064, Xi' an, China, Apr. 8-Apr. 12, 2019, Agenda item: 7.2.8.2, Source: Nokia, Nokia Shanghai Bell, Title: Enhancements on Multi-TRP/Panel Transmission, Document for: Discussion and Decision. the whole document. 15 pages.
3GPP TSG-RAN WG2 Meeting #105 bis R2-1904136, Xi' an, China, Apr. 8-Apr. 12, 2019, Agenda item: 11.14, Source: ZTE, Sanechips, Title: Consideration on Enhancement of TCI-State MAC CE for Muliti-TRP transmission, Document for: Discussion and Decision. the whole document. 7 pages.
First Office Action of the Japanese application No. 2021-576139, issued on Jul. 28, 2023. 12 pages with English translation.
First Office Action of the Chinese application No. 202210014688.3, issued on Feb. 23, 2023. 14 pages with English translation.
Notice of Allowance of the Chinese application No. 202210014688. 3, issued on Apr. 28, 2023. 7 pages with English translation.
Huawei et al:"Enhancements on Multi-TRP/panel transmission", 3GPP Draft. R1-1903970, vol. RAN WG1, No. Xi'an, China; Apr. 8, 2019-Apr. 12, 2019 Apr. 7, 2019 (Apr. 7, 2019), XP051699383. 20 pages.
Supplementary European Search Report in European application No. 19940656.2, mailed on Apr. 4, 2022. 9 pages.
Office Action of the Indian application No. 202127061541, issued on May 5, 2022. 7 pages with English translation.
Written Opinion of the International Search Authority in the international application No. PCT/CN2019/099528, mailed on May 7, 2020. 9 pages with English translation.
International Search Report in the international application No. PCT/CN2019/099528, mailed on May 7, 2020.
First Office Action of the Vietnamese application No. 1-2021-08417, issued on Mar. 22, 2024. 4 pages with English translation.
Decision of Refusal of the Japanese application No. 2021-576139, issued on May 14, 2024. 6 pages with English translation.
European Search Report in the European application No. 23207705. 7, mailed on Feb. 21, 2024. 6 pages.
Second Office Action of the Japanese application No. 2021-576139, issued on Nov. 28, 2023. 6 pages with English translation.
3GPP TSG RAN WG1 #96 Meeting R1-1902563, Athens, Greece, Feb. 25-Mar. 1, 2019, Agenda item: 7.2.8.2, Source: Nokia, Nokia Shanghai Bell, Title: Enhancements on Multi-TRP/Panel Transmission, Document for: Discussion and Decision. the whole document. 16 pages.
3GPP TSG RAN WG1 Meeting RAN1#97 R1-1907697, Reno, US, May 13-17, 2019, Source: Ericsson, Title: On multi-TRP and multi-panel, Agenda Item: 7.2.8.2, Document for: Discussion and Decision. the whole document. 19 pages.
Vivo, "Further Discussion on Multi-TRP Transmission", 3GPP TSG RAN WG1 #96bis R1-1904096, Xi'an, China, Apr. 8-12, 2019, pp. 1-14.
Huawei et al, "Summary of AI: 7.2.8.2 Enhancements on Multi-TRP/Panel Transmission of Offline Discussion", 3GPP TSG RAN WG1 Meeting #97 R1-1907706, Reno, USA, May 13-17, 2019, pp. 1-66.
First Office Action of the Korean application No. 10-2021-7043140, issued on Oct. 29, 2024. 13 pages with English translation.
Vivo, "Further discussion on Multi-TRP/Panel transmission", 3GPP TSG RAN WG1 #97 R1-1906159, Reno, USA, May 13-17, 2019, pp. 1-18.
ZTE, "Discussion on NR Mobility Enhancements in Physical Layer", 3GPP TSG RAN WG1 #97 R1-1906423, Reno, USA, May 13-17, 2019, pp. 1-7.
Reconsideration Report by Examiner before Appeal of the Japanese application No. 2021-576139, issued on Dec. 12, 2024. 4 pages with English translation.
First Office Action of the Australian application No. 2019460763, issued on Dec. 18, 2024. 3 pages.

* cited by examiner

The UE receives first DCI used for scheduling first downlink data transmission — 21

The network device sends first DCI used for scheduling first downlink data transmission to UE — 31

| | | | | | | | | |
|---|---|---|---|---|---|---|---|---|
| R | Serving cell ID | | | | | BWP ID | | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |
FIG. 8
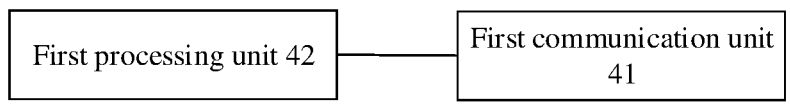
FIG. 9
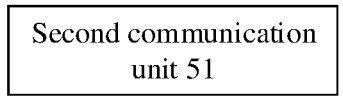
FIG. 10
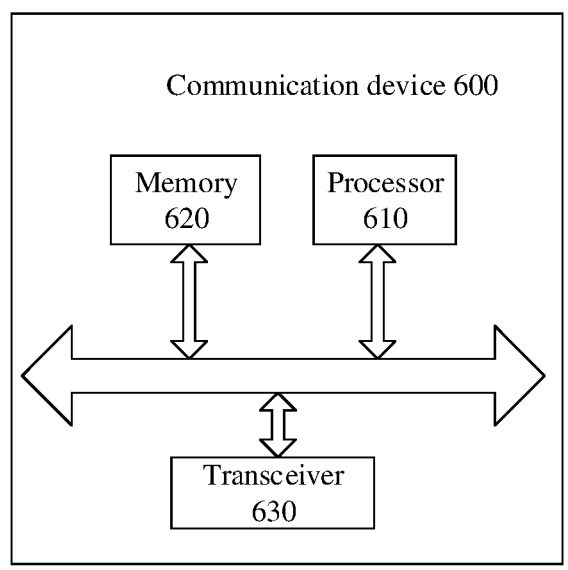
FIG. 11

INFORMATION PROCESSING METHOD, NETWORK DEVICE, AND USER EQUIPMENT

CROSS-REFERENCE TO RELATED APPLICATION

This is a continuation application of International Patent Application No. PCT/CN2019/099528 filed on Aug. 6, 2019, the contents of which are hereby incorporated by reference in its entirety.

BACKGROUND

It is proposed in discussions about New Radio (NR)/5th-Generation (5G) to arrange multiple Transmission/Reception Points (TRPs) or multiple antenna panels or multiple beams to simultaneously transmit downlink data to UE.

However, there is yet no detailed processing method for a scene that UE simultaneously receives multiple downlink data. As a result, there may be such a problem that system performance cannot be improved.

SUMMARY

Embodiments of the disclosure relate to the technical field of information processing, and provide an information processing method, User Equipment (UE), a network device, a chip, a computer-readable storage medium, a computer program product, and a computer program.

A first aspect provides an information processing method, which may be applied to UE and include the following operation.

The UE receives first Downlink Control Information (DCI) used for scheduling first downlink data transmission.

The first DCI may be transmitted on a first Control Resource Set (CORESET) in a first CORESET group. The first CORESET group may include one or more CORESETs.

A second aspect provides UE, which may include a first communication unit.

The first communication unit is configured to receive first DCI used for scheduling first downlink data transmission.

The first DCI may be transmitted on a first CORESET in a first CORESET group. The first CORESET group may include one or more CORESETs.

A third aspect provides an information processing method, which may be applied to a network device and include the following operation.

First DCI used for scheduling first downlink data transmission is sent to UE.

The first DCI may be transmitted on a first CORESET in a first CORESET group. The first CORESET group may include one or more CORESETs.

A fourth aspect provides a network device, which may include a second communication unit.

The second communication unit is configured to send first DCI used for scheduling first downlink data transmission to UE.

The first DCI may be transmitted on a first CORESET in a first CORESET group. The first CORESET group may include one or more CORESETs.

A fifth aspect provides UE, which may include a processor and a memory. The memory may be configured to store a computer program. The processor may be configured to call and run the computer program stored in the memory to execute the method in the first aspect or each implementation mode thereof.

A sixth aspect provides a network device, which may include a processor and a memory. The memory may be configured to store a computer program, and the processor may be configured to call and run the computer program stored in the memory to execute the method in the third aspect or each implementation mode thereof.

A seventh aspect provides a chip, which is configured to implement the method in each implementation mode mentioned above.

Specifically, the chip may include a processor, configured to call and run a computer program in a memory to cause a device installed with the chip to execute the method in any one of the first aspect and the third aspect or each implementation mode thereof.

An eighth aspect provides a computer-readable storage medium configured to store a computer program. The computer program may enable a computer to execute the method in any one of the first aspect and the third aspect or each implementation mode thereof.

A ninth aspect provides a computer program product including a computer program instruction. The computer program instruction may enable a computer to execute the method in any one of the first aspect to the second aspect or each implementation mode thereof.

A tenth aspect provides a computer program. The computer program may run in a computer to enable the computer to execute the method in any one of the first aspect and the third aspect or each implementation mode thereof.

With the solutions, corresponding DCI may be received on a CORESET in a corresponding CORESET group, thereby associating DCI with different CORESET groups. As such, control resources are distinguished to distinguish different downlink data, so that system performance is improved. In addition, such a processing manner is more suitable for the transmission of downlink data through multiple TRPs, or multiple panels or multiple beams.

BRIEF DESCRIPTION OF THE DRAWINGS

FIG. 8 is a schematic format diagram of multiple MAC CEs.

FIG. 9 is a composition structure diagram of UE according to an embodiment of the disclosure.

FIG. 10 is a composition structure diagram of a network device according to an embodiment of the disclosure.

FIG. 11 is a composition structure diagram of a communication device according to an embodiment of the disclosure.

DETAILED DESCRIPTION

In order to make the characteristics and technical contents of the embodiments of the disclosure understood in more detail, the implementation of the embodiments of the disclosure will be described below in combination with the drawings in detail. The drawings are only adopted for description as references and not intended to limit the embodiments of the disclosure.

The technical solutions in the embodiments of the disclosure will be described below in combination with the drawings in the embodiments of the disclosure. It is apparent that the described embodiments are not all but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figures 1, 2, 3:
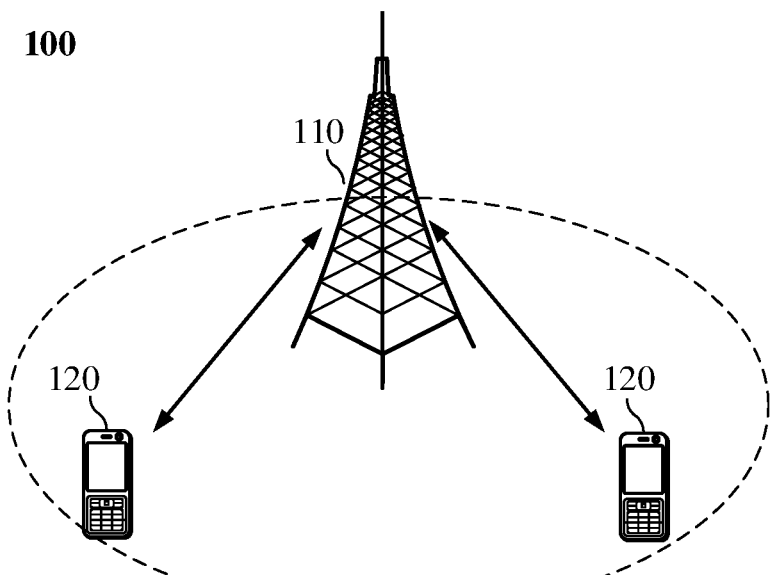
FIG. 1 is a first schematic diagram of an architecture of a communication system according to an embodiment of the disclosure.
FIG. 2 is a first schematic flowchart of an information processing method according to an embodiment of the disclosure.
FIG. 3 is a second schematic flowchart of an information processing method according to an embodiment of the disclosure.

Exemplarily, a communication system 100 to which the embodiments of the disclosure are applied may be illustrated in FIG. 1. The communication system 100 may include a network device 110. The network device 110 may be a device communicating with UE 120 (or called communication UE and UE). The network device 110 may provide a communication coverage for a specific geographical region and communicate with UE in the coverage. In an example, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Alternatively, the network device may be a mobile switching center, a relay station, an access point, a vehicle-mounted device, a wearable device, a hub, a switch, a network bridge, a router, a network device in a 5G network, a network device in a future evolved Public Land Mobile Network (PLMN), or the like.

The communication system 100 further includes at least one of UEs 120 within the coverage of the network device 110. As used herein, "UE" includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another UE arranged to receive/transmit a communication signal; and/or an Internet of Things (IoT) device. The UE configured to communicate through a wireless interface may be referred to as "wireless communication UE", "wireless UE", or "mobile UE".

In an example, Device to Device (D2D) communication may be performed between the UEs 120.

It is to be understood that terms "system" and "network" in the disclosure may usually be interchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

In order to make the characteristics and technical contents of the embodiments of the disclosure understood in more detail, the implementation of the embodiments of the disclosure will be described below in combination with the drawings in detail. The drawings are only adopted for description as references and not intended to limit the embodiments of the disclosure.

In the solution provided in the embodiment, the UE may receive multiple DCI transmitted by the network device on multiple CORESETs in multiple CORESET groups. Different CORESET groups in the multiple CORESET groups correspond to different TRPs, or different antenna panels, or different beam groups. Then, downlink channels scheduled by the multiple DCI are received using multiple TCI states or QCL hypotheses. In this way, a processing manner for the UE to receive multiple downlink data in case of multiple TRPs, multiple antenna panels or multiple beam groups is provided, thereby improving the system performance.

An embodiment of the disclosure provides an information processing method, which is applied to a UE. As illustrated in FIG. 2, the method includes the following operation.

In 21, the UE receives first DCI used for scheduling first downlink data transmission. The first DCI is transmitted on a first CORESET in a first CORESET group. The first CORESET group includes one or more CORESETs.

Correspondingly, the embodiment provides an information processing method, which is applied to a network device. As illustrated in FIG. 3, the method includes the following operation.

In 31, the network device sends first DCI used for scheduling first downlink data transmission to UE. The first DCI is transmitted on a first CORESET in a first CORESET group. The first CORESET group includes one or more CORESETs.

In the embodiment, the network device configures multiple CORESET groups including the first CORESET group for the UE. That is, the UE receives the multiple CORESET groups configured by the network device and including the first CORESET group.

Specifically, the network device may configure one or more CORESET groups for the UE. A condition of configuring multiple CORESET groups is emphasized in the embodiment.

Different CORESET groups in the multiple CORESET groups may correspond to different TRPs, or different antenna panels, or different beam groups. Therefore, different CORESET groups may be distinguished to distinguish different TRPs, panels and beam groups, and the number of bits needed by part of indication information in DCI may be reduced.

The above multiple CORESETs or CORESET groups may correspond to the same BandWidth Part (BWP). In addition, different CORESET groups in the multiple CORESET groups are associated with different indexes.

For example, different CORESET groups may be associated with different identifiers (IDs) or indexes, and all CORESETs in the same CORESET group may correspond to the same ID.

There may also be another condition, namely the CORESET group is not associated with an index. In such case, all CORESETs may be considered as belonging to the same CORESET group, and the CORESET group is not required to be configured.

In the embodiment, CORESETs in different CORESET groups may be configured by the same first signaling. In addition, CORESETs in different CORESET groups may also be configured by different signaling.

The first signaling may be Physical Downlink Control Channel (PDCCH) configuration signaling.

In an example, the maximum number of CORESETs configured in PDCCH-config (PDCCH configuration) signaling may be 5, and of course, may also be larger or smaller, which is not exhaustive in the embodiment. If the number of the CORESETs in PDCCH-config is set to be less than or equal to 5, higher processing flexibility may be achieved, and the processing complexity may be reduced.

Whether the UE may support a combination of multiple CORESETs may be reported through a capability of the UE. Specifically, whether the UE supports multiple CORESET groups may be reported through UE capability information. Correspondingly, the network device may receive the UE capability information and determines based on the UE capability information whether the UE supports the multiple CORESET groups. The multiple CORESET groups may be configured for the UE if the multiple CORESET groups are supported by the UE. Otherwise, only one CORESET group is configured, or no CORESET group is configured.

Furthermore, the operation that whether the UE supports multiple CORESET groups through UE capability information is implemented as follows.

Whether the UE supports the multiple CORESET groups on different bands of multiple bands is reported through the UE capability information.

Or, whether the UE supports the multiple CORESET groups on different band groups of multiple band groups is reported through the UE capability information.

For example, some bands or band combinations support multiple CORESET groups, while some bands or band combinations do not support multiple CORESET groups. For example, IDs of bands or IDs of band combinations may be reported when the UE capability information is reported to further indicate whether one or more bands (or one or more band combinations) support multiple CORESET groups through indicator bits. Indicator bit 1 may indicate support, and indicator bit 0 may indicate no support. Of course, the reverse is also true, which is not exhaustive herein. There are other similar indication methods. For example, the indicator bit may be assigned with a specific value (e.g., "support") to indicate support, and is not configured to indicate that the UE does not support.

Correspondingly, the network device may determine whether multiple CORESET groups may be configured for the UE according to the capability information reported by the UE.

As described above, different CORESET groups in the multiple CORESET groups are associated with different indexes. Each CORESET in the same CORESET group may be associated with the same ID.

In an example, the ID is an ID of the CORESET group. The ID may be configured by the network device through Radio Resource Control (RRC) signaling or Media Access Control (MAC) Control Element (CE) signaling or indicated by information carried in a physical-layer channel or a physical-layer signal. As such, the concept of the ID of the CORESET group is introduced to further simplify the signaling. In addition, the ID may be configured more simply by RRC or MAC CE, and higher system flexibility may be achieved by carrying the ID through the physical-layer signal.

The information carried in the physical-layer channel or the physical-layer signal is indication information in DCI or a Radio Network Temporary Identity (RNTI) used for scrambling DCI. Specifically, when the ID information is carried through the physical-layer signal or the physical-layer channel, a specific associated ID may be indicated by the indication information in the DCI, or, a specific associated ID may be determined through the RNTI. For example, RNTI-1 is associated with ID 1, and RNTI-2 is associated with ID 2.

In an example, different CORESET groups correspond to different Acknowledgment (ACK)/Negative Acknowledgment (NACK) codebooks respectively. In such case, ACKs/NACKs corresponding to scheduling data of different CORESET groups may be transmitted independently, thereby supporting a non-ideal backhaul scene effectively.

In such case, indexes of different CORESET groups may not be set, or, IDs of the CORESET groups may also correspond to ACK/NACK codebooks, namely different indexes correspond to different ACK/NACK codebooks.

In addition, there is another condition that different CORESET groups may correspond to the same ACK/NACK codebook.

In an example, based on the abovementioned solution, the embodiment may further include the following operation.

The UE detects second DCI for scheduling second downlink data.

The second DCI is transmitted on a second CORESET in a second CORESET group.

That is, the UE may detect the first DCI, and may also detect the second DCI, and of course, may further detect more DCI. Different CORESET groups may correspond to different DCI.

In this manner, the UE may support the simultaneous transmission of multiple downlink data channels, so that the data transmission rate is improved.

Furthermore, the second DCI and the first DCI are used for scheduling respective corresponding first downlink channels.

The first downlink channel may be a Physical Downlink Shared Channel (PDSCH).

In the embodiment, the first DCI corresponds to a first TCI state group, and/or the second DCI corresponds to a second TCI state group.

As such, different sending beams (or corresponding receiving beams) may be used when transmission of different PDSCHs by different TRPs/panels/beams is supported. For example, the first DCI is sent from TRP1, and a PDSCH scheduled by the first DCI is also sent from TRP1. The second DCI is sent from TRP2, and a PDSCH scheduled by the second DCI is also sent from TRP2.

With respect to TCI states, a network device in an NR system may indicate a corresponding TCI state for a downlink signal or a downlink channel.

If the network device configures a Quasi co-location (QCL) reference signal of a target downlink channel or a target downlink signal as a reference Synchronization Signal Block (SSB) or reference Channel State Information-Reference Signal (CSI-RS) resource through a TCI state and a QCL type is configured as typeA, typeB or typeC, the UE may assume that large-scale parameters of the target downlink signal and the reference SSB or reference CSI-RS resource are the same. The large-scale parameter is determined by a QCL type configuration.

If the network device configures a QCL reference signal of a target downlink channel or downlink signal as a reference SSB or reference CSI-RS resource through a TCI state and a QCL type is configured as typeD, the UE may receive the target downlink signal using the same receiving beam (i.e., Spatial Rx parameter) as that for receiving the reference SSB or reference CSI-RS resource. Generally, the target downlink channel (or downlink signal) and the reference SSB or reference CSI-RS resource thereof are sent by the network device through the same TRP or the same panel or the same beam. Different TCI states may usually be configured if transmission TRPs or transmission panels or sending beams for two downlink signals or downlink channels are different.

Figure 4:
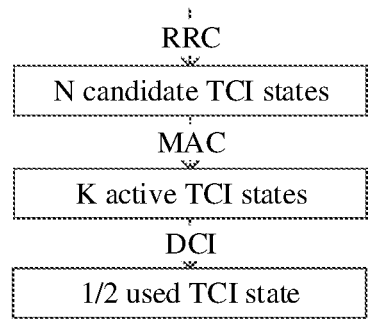
FIG. 4 is a processing flowchart of a TCI selection according to an embodiment of the disclosure.

For a downlink control channel, a TCI state corresponding to a CORESET may be indicated by RRC signal or a combination of RRC signaling and MAC signaling. As illustrated in FIG. 4, for a downlink data channel, an available TCI state group is indicated by RRC signaling, part of TCI states are activated through MAC-layer signaling, and finally, one or two TCI states in the activated TCI states are indicated through a TCI state indication field in the DCI for a PDSCH scheduled by DCI.

In discussions about NR/5G, a scheme for simultaneously transmitting downlink data to UE through multiple TRPs or multiple panels or multiple beams supports a multiple-PDCCH based scheme. That is, the UE receives different NR-PDCCHs from different TRPs/panels/beams. DCI detected on each control channel PDCCH indicates related indication information of a corresponding data transmission. For example, references are made to FIG. 5 which illustrates a multi-TRP scene and FIG. 6 which is a schematic diagram of a multi-beam scene.

At least one of the following possible application scenes is included.

Multiple TRPs belong to the same cell, and backhauls between the TRPs are ideal.

Multiple TRPs belong to the same cell, and backhauls between the TRPs are non-ideal.

Multiple TRPs belong to different cells, and backhauls between the TRPs are ideal.

Multiple TRPs belong to different cells, and backhauls between the TRPs are non-ideal.

Application scenes formed by replacing TRP in the above application scenes with beam or panel are further included.

The method further includes the following operations.

One or more TCI state groups configured by the network for the UE are received.

Or, the UE acquires one or more TCI state groups based on indication information.

The first TCI state group includes one or more TCI states.

The one or more TCI state groups correspond to the same BWP.

That the network configures one or more TCI state groups for the UE may be understood as that the network device directly configures the TCI state groups for the UE. That the UE acquires one or more TCI state groups based on indication information may be understood as that the one or more TCI state groups may be obtained through analyzing the indication information (e.g., indication information sent through one of RRC, MAC CE, and DCI) sent by the network device. That is, one manner is direct configuration, and the other manner is indirect inference or analysis based on the indication information.

It is to be noted that, if there are multiple TCI state groups, each TCI state group may include multiple TCI states.

The number of TCI states that a TCI state group may include may be not greater than N. N may be determined according to a practical condition. For example, N may be equal to 8.

TCI states in different TCI state groups in the one or more TCI state groups may be configured by the same second signaling. The second signaling may be PDSCH configuration signaling. In an example, the PDSCH configuration signaling may be RRC Information Element (IE) PDSCH-Config.

Furthermore, the first TCI state group may be determined by RRC signaling. For example, multiple TCI states may be configured through RRC, and then TCI states in a certain TCI group are indicated through RRC signaling. For example, each TCI state may correspond to a TCI state index, TCI state indexes corresponding to TCIs in a TCI group are indicated through RRC signaling, and the UE may further know the TCI states forming the TCI group. For example, TCI state group-1 is configured by RRC signaling, which includes TCI-1 to TCI-3, so that the TCI group may be determined. According to another method, for example, each TCI state may correspond to an ID, and TCI states corresponding to the same ID belong to the same TCI group. Therefore, MAC CE signaling may be saved, and information to be configured and the signaling overhead may be reduced.

The TCI state groups may correspond to CORESET groups. For example, the first TCI state group corresponds to the first CORESET group bearing the first DCI. Alternatively, the first TCI state group corresponds to the first CORESET group.

In addition, the manner for determining the first TCI state group may be determined according to the first TCI state group. Specifically, the method may further include that the UE determines the first TCI state group according to RRC signaling of the network device. Correspondingly, the network device configures the first TCI state group through the RRC signaling.

The first TCI state group corresponds to the first CORESET group.

The first TCI state group corresponds to the CORESET bearing the first DCI.

The first TCI state group may further be determined based on the first TCI state group in the following manners.

The first TCI state group may be a first TCI state group. Therefore, MAC CE signaling may be saved.

Alternatively, at least part of TCI states in the first TCI state group are selected and determined as the first TCI state group according to MAC CE signaling. For example, after multiple TCI states have been configured to form a first TCI state group, one or more TCI states are selected from the first TCI state group to form a first TCI state group according to the MAC CE signaling.

A maximum number of TCI states in the TCI state group may be determined according to a first capability of the UE. First capability information of the UE may be reported to the network device by the UE. The UE may report the first capability information through third signaling. The third signaling may be maxNumberActiveTCI-PerBWP. In an example, the first capability is reported according to bands. That is, corresponding first capabilities may be reported independently for different bands or different band combinations.

Correspondingly, the maximum TCI state number may be determined in one of the following manners.

The first capability reported by the UE is determined as the maximum TCI state number.

The first capability reported by the UE is divided by a maximum CORESET group number supported by the UE to obtain the maximum TCI state number.

The first capability reported by the UE is multiplied by the maximum CORESET group number supported by the UE to obtain the maximum TCI state number.

In an example, determination of the maximum TCI state number may be executed by both a UE side and a network device side. That is, the UE needs to determine a maximum TCI state number that may be supported by the UE on one hand, and the network device also needs to know a maximum TCI state number that may be configured for the UE on the other hand. Alternatively, the above determination may be executed by one of the UE side and the network device side. That is, the determination may be executed independently by the UE side. In such case, the UE may calculate the maximum number according to the above manner even if the network device does not know the maximum TCI state number supported by the UE, and may further determine whether configured TCI states exceed the maximum number. If YES, part of TCI states may be selected, and a selection result may further be notified to the network device. If the determination is executed independently by the network device, the maximum number is calculated based on the above manner, and TCI states are further configured for the UE according to the calculation result.

In addition, besides the above manner, the first TCI state group may also be determined in the following manner.

One or more TCI states are determined according to RRC configuration signaling.

At least part of TCI states in the configured one or more TCI states are selected as the first TCI state group according to the MAC CE signaling.

As such, the system flexibility may be improved, and the overhead of the RRC signaling may be reduced.

Similar to the above, the first TCI state group may correspond to the first CORESET group. Alternatively, the first TCI state group may correspond to the CORESET group bearing the first DCI. In addition, a maximum value of TCI data may also be determined based on the first capability information as described above, which are not elaborated herein.

The method further includes the following operation.

The first downlink channel scheduled by the first DCI is received using a first TCI state or a QCL hypothesis corresponding to the first TCI state responsive to that the first TCI state group only includes the first TCI state.

As such, the signaling overhead may be reduced, and meanwhile, a delay may be shortened.

In the NR system, the network device may indicate corresponding QCL state information to the UE through a TCI state when transmitting a downlink control channel or data channel.

A TCI state may include the following configurations: TCI state ID for identifying the TCI state, QCL information 1, and QCL information 2 (optional).

QCL information further includes the following information: a QCL type configuration and a QCL reference signal configuration.

The QCL type configuration may be one of QCL typeA, QCL typeB, QCL typeC, or QCL typeD.

The QCL reference signal configuration may include a cell ID corresponding to a reference signal, a BWP ID and an ID of the reference signal (which may be a CSI-RS resource ID or an SSB index).

If both QCL information 1 and QCL information 2 are configured, a QCL type of at least one QCL information is required to be one of typeA, typeB, and typeC, and a QCL type of the other QCL information (if configured) is required to be QCL typeD.

Different QCL type configurations are defined as follows:
'QCL-TypeA': {Doppler shift, Doppler spread, average delay, delay spread};
'QCL-TypeB': {Doppler shift, Doppler spread};
'QCL-TypeC': {Doppler shift, average delay}; and
'QCL-TypeD': {Spatial Rx parameter}.

The solution provided in the embodiment may include the followings.

In the first scheme, the first DCI includes first TCI state indication information, and the first TCI state indication information is configured to indicate a TCI state in the first TCI state group. As such, flexible and dynamic indication by DCI may be implemented, and the system performance may be improved.

Whether the first DCI may include the first TCI state indication information may be determined as follows.

It is determined that the first DCI includes the first TCI state indication information when a first condition is satisfied. As such, a related configuration is restricted to reduce the implementation complexity of the UE/network.

The first condition includes at least one of the followings.
The UE is configured with multiple TCI state groups.
The UE is configured with multiple TCI state groups, and TCI state information in the multiple TCI state groups includes QCL-TypeD information.
The UE is configured with multiple CORESET groups.
The UE is configured with multiple CORESET groups, and TCI state information in multiple TCI state groups includes QCL-TypeD information.
A format of the first DCI is DCI format 1_1, and a second condition is satisfied.

The second condition includes at least one of the followings.
The UE is configured with multiple TCI state groups.
The UE is configured with multiple TCI state groups, and TCI state information in the multiple TCI state groups includes QCL-TypeD information.
The UE is configured with multiple CORESET groups.
The UE is configured with multiple CORESET groups, and TCI state information in multiple TCI state groups includes QCL-TypeD information.

The first CORESET for transmitting the first DCI includes configuration signaling. The configuration signaling is configured to indicate whether the corresponding first DCI includes a TCI state indication field. For example, when the parameter tci-PresentInDCI in the first CORESET for transmitting the first DCI is set to "enabled", it indicates that the first DCI includes the TCI state indication field. In an example, when the parameter tci-PresentInDCI in the first CORESET for transmitting the first DCI is not configured, it indicates that the first DCI does not include a TCI state indication field.

In an example, a format of the first DCI is DCI format 1_1. In such case, the first TCI state may be indicated by determining the first TCI state indication information based on a content in a transmission configuration indication field in the first DCI. For example, the first TCI state indication information is indicated through the field "Transmission Configuration Indication" in the first DCI.

In an example, a scheduling time offset of DCI may be determined in the following manner. It is to be pointed out that the following manner is applicable to the UE side and the network device side. That is, the two parties may use the same judgment manner After determining a scheduling time offset of the first DCI based on a third condition, the UE may perform reception based on the scheduling time offset. Similarly, the network device may determine sending time of the first DCI based on the scheduling time offset, specifically as follows.

It is determined whether a scheduling time offset of the first DCI is more than or not less than a first threshold when a third condition is satisfied.

The third condition includes at least one of the followings.

The UE is configured with multiple TCI state groups.

The UE is configured with multiple TCI state groups, and at least one TCI state information includes QCL-TypeD information.

The UE is configured with multiple CORESET groups.

The UE is configured with multiple CORESET groups, and at least one TCI state information includes QCL-TypeD information.

The above term "equal to" can be understood as approximately equal to or equal to the first threshold as expected by the UE.

As such, the DCI scheduling delay may be limited, and the implementation complexity of the UE/network may be reduced.

Furthermore, the first downlink channel scheduled by the first DCI is received using a TCI state indicated by the first DCI or a QCL hypothesis corresponding to the TCI state responsive to that the scheduling time offset of the first DCI is more than or not less than the first threshold. The first downlink channel may be a PDSCH. Therefore, more flexible beam indication is implemented, thereby facilitating scheduling of the system on different beams and improving the system performance.

And/or, responsive to that the scheduling time offset of the first DCI is less than or not greater than the first threshold, the QCL hypothesis/TCI state used when the downlink channel scheduled by the first DCI is received is the same as the second CORESET, or the QCL-TypeD related QCL hypothesis/TCI state used when the downlink channel scheduled by the first DCI is received is the same as the second CORESET. Therefore, the scheduling delay is reduced, and user experiences of highly delay sensitive services are improved.

It is to be pointed out that the second CORESET may be a second CORESET determined from the first CORESET group corresponding to the DCI or a second CORESET determined from multiple CORESET groups.

The second CORESET may be a CORESET satisfying a fourth condition.

The fourth condition is that the second CORESET is a CORESET with a minimum ID in at least one CORESET of the first CORESET group detected on a first slot closest to a second downlink channel. The second downlink channel may be a PDCCH.

Specifically, the second CORESET may be a CORESET in the first CORESET group.

The UE detects the control channel on different slots. The UE detects at least one CORESET in the first CORESET group on slot S1 (i.e., the first slot) closest to the PDSCH, and then selects a CORESET with a minimum CORESET-ID from the at least one CORESET as the second CORESET.

Alternatively, the second CORESET may be a CORESET satisfying a fifth condition. The fifth condition may be that the second CORESET is a CORESET with a minimum ID in at least one CORESET of multiple CORESET groups detected on a first slot closest to a second downlink channel. The second downlink channel may be a PDCCH. In addition, the multiple CORESET groups may be all CORESET groups configured presently.

Specifically, the second CORESET may be a CORESET in the multiple CORESET groups. A determination manner may be as follows. The UE detects the control channel on different slots at first. The UE detects at least one CORESET in the multiple CORESET groups on slot S1 (i.e., the first slot) closest to the PDSCH, and selects a CORESET with a minimum CORESET-ID in the at least one CORESET as the second CORESET.

In an example, if all TCI states configured by the UE on a serving cell do not include "QCL-TypeD" or all TCI states in the first TCI state group do not include "QCL-TypeD", a QCL hypothesis/TCI state used when the downlink channel scheduled by the first DCI is received may use a TCI state indicated by the first DCI no matter whether the scheduling time offset of the first DCI is more than or not less than the first threshold.

When the first DCI schedules a multi-slot first downlink channel, the TCI state indicated by the first DCI is one of TCI states activated at a first slot in the scheduled multi-slot first downlink channel. In an example, the activated TCI state is kept unchanged on all corresponding slots of the scheduled multi-slot first downlink channel.

In an example, the second downlink channel is received at first if QCL-TypeD information corresponding to the first downlink channel is different from that corresponding to the second downlink channel in correspondence with the first CORESET group and the first downlink channel overlaps the second downlink channel on a time domain.

The first downlink channel is a PDSCH. The second downlink channel is a PDCCH.

That is, if "QCL-TypeD" information corresponding to the PDSCH is different from the PDCCH corresponding to the first CORESET group (or different from a certain CORESET in the first CORESET group) and the PDSCH overlaps with the PDCCH (or the CORESET) in time domain, the UE preferentially receives the PDCCH (or preferentially receives the CORESET). As such, reception of the PDCCH is preferentially ensured, and the system performance is improved.

Such a processing is suitable for single-carrier scheduling or intra-band Carrier Aggregation (CA). When the processing is suitable for CA, the PDSCH (i.e., the first downlink channel) and the CORESET may correspond to different component carriers.

Furthermore, when a sixth condition is satisfied, the first downlink channel scheduled by the first DCI is received using a TCI state indicated by the first DCI or a QCL hypothesis corresponding to the TCI state.

The sixth condition includes at least one of the followings.

All TCI states on a scheduled BWP or serving cell include no QCL-TypeD related information.

TCI states in all TCI state groups on a scheduled BWP or serving cell include no QCL-TypeD related information.

TCI states in all TCI state groups on a scheduled BWP or serving cell do not include QCL-TypeD related information.

As such, a low-frequency system may be optimally designed, and the system performance may be improved.

If the first DCI schedules a multi-slot first downlink channel, namely the first DCI schedules a multi-slot PDSCH, the TCI state indicated by the first DCI is a TCI state activated at a first slot in the scheduled multi-slot PDSCH. The activated TCI state is kept unchanged on all slots corresponding to the scheduled multi-slot PDSCH.

In the embodiment, the first threshold is configured by the network device, or specified in a protocol, or determined based on the reported UE capability. Determination of the first threshold based on the reported UE capability may facilitate to support UEs with different capabilities.

When the first threshold is determined based on the reported UE capability, reporting may be independently performed based on different bands or band combinations. In an example, the capability of the UE may be reported through the parameter timeDurationForQCL.

In the second scheme, the first DCI does not include first TCI state indication information.

The scheme may reduce an information size of the DCI and reduce the overhead.

A format of the first DCI is DCI format 1_1. Therefore, an existing DCI format may be reused, the standardization workload may be reduced, and the implementation complexity of the UE and the network may be reduced.

Different from the previous manner, in the present manner, configuration signaling in the first CORESET for transmitting the first DCI does not indicate that the corresponding DCI includes a TCI state indication field.

As an example, the parameter tci-PresentInDCI in the first CORESET for transmitting the first DCI is not configured, or adopts a default value.

Alternatively, a format of the first DCI is DCI format 1_0. Therefore, an existing DCI format may be reused, the standardization workload may be reduced, and the implementation complexity of the UE and the network may be reduced.

In the present manner, it is determined whether a scheduling time offset of the first DCI is more than or equal to a first threshold when a seventh condition is satisfied.

The seventh condition includes at least one of the followings.

The UE is configured with multiple TCI state groups.

The UE is configured with multiple TCI state groups, and at least one TCI state information includes QCL-TypeD information.

The UE is configured with multiple CORESET groups.

The UE is configured with multiple CORESET groups, and at least one TCI state information includes QCL-TypeD information.

Similarly, the term "equal to" may be approximately equal to or equal to as expected by the UE, namely infinitely close to the first threshold. As such, the DCI scheduling delay is limited, and the implementation complexity of the UE/network is reduced.

If the scheduling time offset of the first DCI is more than or not less than the first threshold, the first downlink channel scheduled by the first DCI is received using a TCI state or QCL hypothesis corresponding to the first CORESET bearing the first DCI.

If the scheduling time offset of the first DCI is less than or equal to the first threshold, a PDSCH scheduled by the first DCI is received using the same QCL hypothesis as a third CORESET, or the PDSCH scheduled by the first DCI is received using the same QCL hypothesis corresponding to a QCL-TypeD as the third CORESET. Therefore, the scheduling delay may be reduced, and user experiences of highly delay sensitive services may be improved.

The third CORESET satisfies an eighth condition. The eighth condition is that the third CORESET is a CORESET with a minimum ID in at least one CORESET of the first CORESET group detected on a first slot closest to a second downlink channel.

That is, the third CORESET is a CORESET in the first CORESET group, and may be a CORESET with a minimum ID in at least one CORESET of the first CORESET group detected on the first slot closest to the second downlink channel. As such, the transmission of different TRPs/panels/beams may be distinguished, and higher performance may be achieved.

Alternatively, the third CORESET satisfies a ninth condition. The ninth condition is that the third CORESET is a CORESET with a minimum ID in at least one CORESET of multiple CORESET groups detected on the first slot closest to the second downlink channel.

That is, the third CORESET is a CORESET in the multiple CORESET groups, and may be a CORESET with a minimum ID in at least one CORESET of multiple CORESET groups detected on the first slot closest to the second downlink channel.

In an example, if the QCL-TypeD information corresponding to the first downlink channel is different from that corresponding to the second downlink channel in correspondence with the first CORESET group and the first downlink channel overlaps with the second downlink channel in time domain, the second downlink channel is received at first.

For example, if "QCL-TypeD" information corresponding to the PDSCH is different from the PDCCH corresponding to the first CORESET group (or different from a certain CORESET in the first CORESET group) and the PDSCH overlaps with the PDCCH (or the CORESET) in time domain, the UE preferentially receives the PDCCH (or preferentially receives the CORESET). As such, the reception of the PDCCH is preferentially ensured, and the system performance is improved.

The above method is suitable for single-carrier scheduling, and also suitable for intra-band CA (the PDSCH and the CORESET may correspond to different component carriers).

The method further includes the following operation.

The first downlink channel scheduled by the first DCI is received using a TCI state indicated by the first DCI or a QCL hypothesis corresponding to the TCI state when a sixth condition is satisfied.

The sixth condition includes at least one of the followings.

All TCI states on a scheduled BWP or serving cell include no QCL-TypeD related information.

TCI states in all TCI state groups on the scheduled BWP or serving cell include no QCL-TypeD related information.

TCI states in all TCI state groups on the scheduled BWP or serving cell do not include QCL-TypeD related information.

As such, a low-frequency system may be optimally designed, and the system performance may be improved.

The first threshold is configured by the network, or specified in a protocol, or determined based on the reported UE capability. When the first threshold is determined based on the reported UE capability, the UE capability may be independently reported for different bands or different band combinations. In an example, the UE capability may be reported through the parameter timeDurationForQCL. As such, UEs with different capabilities may be supported.

It is finally to be noted that, in the embodiment, multiple CORESET groups and multiple TCI states correspond to a first BWP. Therefore, scheduling of the first downlink channel (PDSCH) in the same BWP may be supported.

The multiple CORESET groups correspond to a first BWP, and the TCI state corresponds to a second BWP. The first BWP and the second BWP are the same BWP, so that PDSCH scheduling in the same BWP may be supported. Alternatively, the first BWP and the second BWP are different BWPs of the same serving cell, so that cross-BWP PDSCH scheduling may be supported.

And/or, the multiple CORESET groups and the multiple TCI states correspond to a first serving cell/carrier. Therefore, PDSCH scheduling in the same serving cell may be supported.

And/or, the multiple CORESET groups correspond to a first serving cell/carrier, the TCI state corresponds to a second serving cell/carrier, and the first serving cell/carrier and the second serving cell/carrier are different serving cells/carriers. Therefore, cross-carrier scheduling of the first downlink channel, i.e., the PDSCH, may be supported.

At least one search space configuration corresponding to at least one CORESET supports cross-carrier scheduling.

And/or, DCI carried in at least one CORESET includes a BWP ID indication field.

In the above solution, if a TCI state includes "QCL-TypeD" information, the UE expects that a DCI scheduling time offset is equal to or not less than the first threshold. The term "equal to" can be understood as approximately equal to or equal to as expected by the UE. The first threshold is configured by the network, or specified in the protocol, or determined based on the reported UE capability. When the first threshold is determined based on the reported UE capability, reporting may be performed through the parameter timeDurationForQCL, so as to support UEs with different capabilities.

The UE feeds back Hybrid Automatic Repeat reQuest (HARQ) related information through a corresponding ACK/NACK codebook according to a detection condition of the PDSCH scheduled by the first DCI. For example, the UE may feed back corresponding HARQ information through ACK/NACK codebook 0 according to a detection condition of a first PDSCH scheduled by the first DCI. The UE may feed back corresponding HARQ information through ACK/NACK codebook 1 according to a detection condition of a second PDSCH scheduled by the second DCI.

The above solution will be described with the following example for the condition of N=2, namely corresponding to two TRPs/panels/beams. It is to be pointed out that the following example may be extended to other larger values of N, and may be suitable for the condition of N=1.

The UE determines multiple CORESETs for a first BWP according to a network configuration. The multiple CORESETs belong to N (N=2) different CORESET groups respectively. The two CORESET groups may be recorded as CORESET group 0 and CORESET group 1, respectively.

CORESET group 0 corresponds to one or more CORESETs. CORESET group 1 corresponds to one or more CORESETs.

Figure 5:
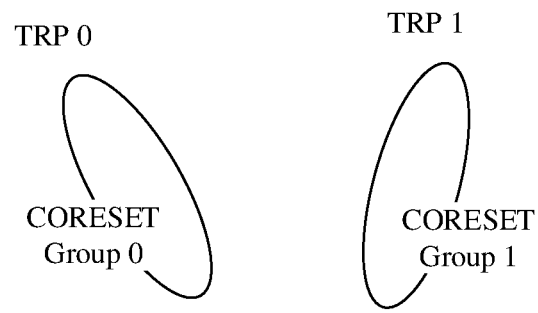
FIG. 5 is a schematic diagram of a multi-TRP or multi-beam scene.
Figure 5:
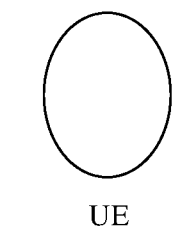
Figure 6:
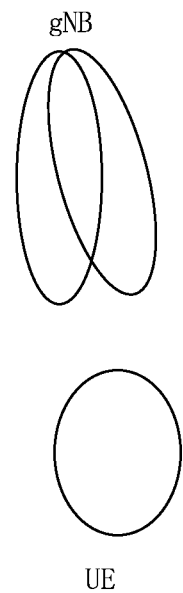
FIG. 6 is a schematic diagram of a multi-TRP or multi-beam scene.

When the network includes N (N=2) TRPs (recorded as TRP0 and TRP1 respectively) deployed at different physical positions, a PDCCH corresponding to CORESET group 0 may be transmitted from TRP0, and a PDCCH corresponding to CORESET group 1 may be transmitted from TRP1 (referring to FIG. 5).

In addition, each CORESET in CORESET group 0 is associated with an ID (or index), and each CORESET in CORESET group 1 is associated with another ID (or index). That is, different CORESET groups may be associated with different IDs. As such, the CORESETs may be distinguished to belong to different groups through the IDs, and signaling is relatively simple.

In the example, the IDs of the CORESET groups may be determined in a manner of determining an ID of a corresponding CORESET group according to indication information. In this manner, the IDs of the CORESET groups may be directly predetermined, so as to simplify the design of related signaling. The indication information may be configured by RRC signaling or MAC CE signaling or indicated by information carried in a physical-layer channel or signal. In such a processing, RRC or MAC CE is easy to implement, the complexity of indicating by information carried in the physical layer is slightly high, but the system is more flexible. The information carried in the physical-layer channel or signal may be indication information in DCI or an RNTI for scrambling DCI.

For example, an RRC signaling processing manner is that indication information is configured in each CORESET configuration information to indicate ID information, and the indication information has two different values (for ease of description, marked as X and Y respectively). A CORESET of which the indication information is valued to X belongs to CORESET group 0, and a CORESET of which the indication information is valued to Y belongs to CORESET group 1. As such, an indication may be added to the existing CORESET configuration information to maximally retain the existing RRC signaling framework and ensure low standardization complexity and simplicity for implementation by the UE and the network.

In the present manner, a value (e.g., X) of the ID information may be a default value. That is, if no indication information is configured, a corresponding CORESET is considered by default as belonging to a certain CORESET group, for example, belonging to CORESET group 0. The default value is predetermined, so that the signaling overhead may be reduced.

Another RRC signaling processing manner may be that: the UE receives network configuration information, the network configuration information indicating N=2 CORESET groups and CORESETs corresponding to each CORESET group. For example, a CORESET group is added by adding a corresponding field to a PDCCH-Config IE in RRC signaling. The added field may be "controlResourceSetToAddModList1 SEQUENCE(SIZE (1 . . . 3)) OF ControlResourceSet OPTIONAL, controlResourceSetToReleaseList1 SEQUENCE(SIZE (1 . . . 3)) OF ControlResourceSetId OPTIONAL,". The added field is optional. If no added field but only an original corresponding field is configured, different CORESET groups are not distinguished, namely all CORESETs belong to the same CORESET group. The original field may be "controlResourceSetToAddModList SEQUENCE(SIZE (1 . . . 3)) OF ControlResourceSet OPTIONAL, —Need N controlResourceSetToReleaseList SEQUENCE(SIZE (1 . . . 3)) OF ControlResourceSetId OPTIONAL, —Need N".

The original field corresponds to one CORESET group (e.g., CORESET group 0). The added field corresponds to the other CORESET group (e.g., CORESET group 1). The two different CORESET groups have corresponding distinguishing information. The distinguishing information is the ID corresponding to the CORESET.

A MAC CE signaling processing manner is that MAC CE signaling for configuring an activated TCI state for a CORESET contains indication information valued to X or Y to indicate ID information. A CORESET of which the indication information is valued to X belongs to CORESET group 0, and a CORESET of which the indication information is valued to Y belongs to CORESET group 1. As such, an indication may be added to the existing MAC CE signaling to maximally retain the existing MAC CE signaling format and ensure low standardization complexity and simplicity for implementation by the UE and the network.

A value (e.g., X) of the ID information may be a default value. That is, if no indication information is configured, a corresponding CORESET is considered by default as belonging to a certain CORESET group (for example, belonging to CORESET group 0). The default value is predetermined, so that the signaling overhead may be reduced.

Figure 7:
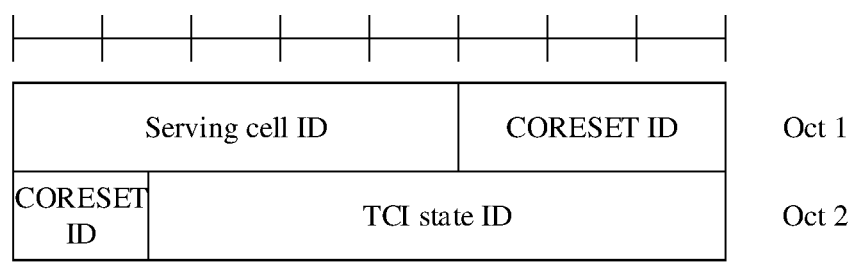
FIG. 7 is a schematic format diagram of multiple MAC CEs.

FIG. 7 is a schematic format diagram of MAC CE signaling used for configuring an activated TCI state for a CORESET. One bit in the last field TCI state ID may be reserved to represent the indication information. It is to be understood that FIG. 7 shows only one MAC CE signaling, and subsequently introduced MAC CEs for configuring activated TCI states for CORESETs may also contain the indication information.

In the example, CORESET group 0 corresponds to ACK/NACK codebook 0, and CORESET group 1 corresponds to ACK/NACK codebook 1. Since ACKs/NACKs corresponding to scheduling data of different CORESET groups may be transmitted independently, a non-ideal backhaul scene may be supported effectively.

The ID of the CORESET group corresponds to the ACK/NACK codebook. That is, different IDs may correspond to different ACK/NACK codebooks.

An ACK/NACK feedback corresponding to a PDSCH scheduled by DCI transmitted in CORESET group 0 corresponds to ACK/NACK codebook 0. An ACK/NACK feedback corresponding to a PDSCH scheduled by DCI transmitted in CORESET group 1 corresponds to ACK/NACK codebook 1.

All CORESETs in different CORESET groups are configured in the same PDCCH-config signaling. The number of CORESETs in a CORESET group may be less than or equal to 5.

Furthermore, with respect to determination of the number of CORESET groups supported by the UE, it may be determined whether multiple CORESET groups are supported may be determined by reporting of the UE capability. Therefore, UEs with different capabilities may be supported. The UE capability is independently reported according to bands (for example, some bands or band combinations support, while some bands or band combinations do not support).

Based on the above, the UE detects first DCI on a resource corresponding to CORESET group 0, and the first DCI schedules a first downlink data channel PDSCH. The UE detects second DCI on a resource corresponding to CORESET group 1, and the second DCI schedules a second downlink data channel PDSCH. It is to be understood that, if there are more CORESET groups such as CORESET groups 2 and 3, the UE may further detect third DCI and fourth DCI from these groups respectively to schedule a third PDSCH and a fourth PDSCH respectively. However, exhaustions are omitted in the example, and the subsequent descriptions are made only with two CORESET groups.

The first DCI corresponds to a first TCI state group, and the second DCI corresponds to a second TCI state group. As such, different sending beams (or corresponding receiving beams) may be used when transmission of different PDSCHs by different TRPs/panels/beams is supported.

The first TCI state group includes one or more TCI states. The second TCI state group includes one or more TCI states. In a preferred example, the number of TCI states in the first TCI state group or the second TCI state group is less than or equal to 8.

Both the first TCI state group and the second TCI state group correspond to a second BWP. In addition, the TCI states in the first TCI state group and the second TCI state group may be configured in the same PDSCH-Config signaling message.

The first TCI state group is determined by RRC signaling (a similar process is performed on the second TCI state group and will not be repeated, and the same process is subsequently performed somewhere else, unless additionally illustrated). Therefore, MAC CE signaling may be saved, and information to be configured and the signaling overhead may be reduced.

In the example, the first TCI state group corresponds to the first CORESET group. In addition, other state groups may correspond to other CORESET groups respectively.

TCI state configuration information in the first TCI state group contains indication information. The indication information corresponds to the first CORESET group. Alternatively, the indication information indicates an ID of the first CORESET group. As such, a new indication may be added to an existing TCI state RRC signaling message to reduce the implementation complexity of the UE using the existing RRC signaling framework.

Two TCI state groups are configured in PDSCH-Config, and each TCI state group corresponds to a CORESET group. For example, a field is added to the signaling message. The two TCI state groups correspond to two CORESET groups respectively. A unified processing is performed in PDSCH-Config to avoid modification on each TCI state RRC signaling message and further reduce the implementation complexity of the UE. The added field may be "tci-StatesToAddModList1 SEQUENCE (SIZE(1 . . . maxNrofTCI-States)) OF TCI-State OPTIONAL, tci-StatesToReleaseList1 SEQUENCE (SIZE(1 . . . maxNrofTCI-States)) OF TCI-StateId OPTIONAL".

The first TCI state group corresponds to a CORESET bearing the first DCI.

Furthermore, the first TCI state group may be determined according to a first TCI state group in RRC configuration signaling.

The whole first TCI state group may be determined as the first TCI state group. Therefore, MAC CE signaling may be saved.

Alternatively, part or all of the TCI states in the first TCI state group may be selected and determined as the first TCI state group according to MAC CE signaling. Therefore, the system flexibility may be improved, and the RRC overhead may be reduced.

In the example, the first TCI state group corresponds to the first CORESET group.

TCI state configuration information in the first TCI state group contains indication information. The indication information corresponds to the first CORESET group, and alternatively, the indication information indicates an ID of the first CORESET group. A new indication may be added to an existing TCI state RRC signaling message to reduce the implementation complexity of the UE using the existing RRC signaling framework.

Two TCI state groups are configured in PDSCH-Config, and each TCI state group corresponds to a CORESET group. For example, a field is added to the signaling message. The two TCI state groups correspond to two CORESET groups respectively. A unified processing is performed in PDSCH-Config to avoid modification on each TCI state RRC signaling message and further reduce the implementation complexity of the UE. The added field may be as described above, and will not be elaborated herein.

The first TCI state group corresponds to the CORESET bearing the first DCI.

In an example, a maximum number of TCI states in the first TCI state group is determined according to a capability reported by the UE. The capability reported by the UE is reported through the signaling maxNumberActiveTCI-PerBWP. For example, the maximum number is a capability A reported by the UE, and the maximum number is (the capability A reported by the UE/CORESET group number B).

In the example, an existing MAC CE signaling may be reused for MAC CE signaling processing, for example, as illustrated in FIG. 8. Since a specific TCI state group to which a certain TCI state belongs has been known according to the RRC signaling, different MAC CE processing manners may be used, for example, as follows.

The existing Ti field is extended (optional) such that more TCI states may be indicated and the UE may know a corresponding TCI state group to which each TCI state belongs according to configuration information of activated TCI states. Therefore, two TCI state groups may be indicated in the same MAC CE.

Alternatively, a reserved bit R may be changed to indicate a specific TCI state group, or specific TCI group or specific CORESET group that the present MAC CE configuration is for. Therefore, the two TCI state groups may be configured independently, and the flexibility is higher.

In the example, the first TCI state group may be determined in the following manner One or more TCI states are configured according to RRC configuration signaling, and then part or all of TCI states in the configured TCI states are selected and determined as the first TCI state group according to MAC CE signaling. Therefore, the system flexibility may be improved, and the RRC overhead may be reduced.

The first TCI state group corresponds to the first CORESET group.

The first TCI state group corresponds to the CORESET bearing the first DCI.

A maximum TCI state number configured by RRC is determined according to a capability reported by the UE. The capability reported by the UE is reported through the signaling maxNumberActiveTCI-PerBWP.

The maximum number is a capability A reported by the UE, or, the maximum number is (the capability A reported by the UE*CORESET group number B).

Alternatively, the existing MAC CE signaling may be reused for MAC CE signaling processing, and a reserved bit R is changed to indicate a specific TCI state group, or specific TCI group or specific CORESET group that the present MAC CE configuration is for. Therefore, the two TCI state groups may be configured independently, and the flexibility is higher.

Furthermore, in combination with the above examples, if the first TCI state group determined according to the network configuration received by the UE includes only one TCI state (recorded as the first TCI state), a TCI state or QCL hypothesis used by the UE to receive the PDSCH scheduled by the first DCI is determined according to the first TCI state. Therefore, optimization may be implemented for a typical scene, the signaling overhead may be reduced, and meanwhile, the delay is reduced.

First DCI signaling contains no TCI state indication information. If the first TCI state group determined according to the network configuration received by the UE includes only one TCI state (recorded as the second TCI state), a TCI state or QCL hypothesis used by the UE to receive the PDSCH scheduled by the first DCI is determined according to the second TCI state.

When the first DCI signaling contains no TCI state indication information, the TCI state corresponding to the PDSCH is not activated or deactivated using a MAC CE.

Other processes of the example are the same as those of the solution in the above embodiments, and thus will not be elaborated.

It is also to be pointed out that, based on the multiple examples, the UE may feed back corresponding HARQ information through ACK/NACK codebook 0 according to a detection condition of a first PDSCH scheduled by the first DCI and the UE feeds back corresponding HARQ information through ACK/NACK codebook 1 according to a detection condition of a second PDSCH scheduled by the second DCI.

An embodiment of the disclosure provides UE. As illustrated in FIG. 9, the UE includes a first communication unit 41.

The first communication unit 41 is configured to receive first DCI used for scheduling first downlink data transmission. The first DCI is transmitted on a first CORESET in a first CORESET group. The first CORESET group includes one or more CORESETs.

Correspondingly, the embodiment provides a network device. As illustrated in FIG. 10, the network device includes a second communication unit 51.

The second communication unit 51 is configured to send first DCI used for scheduling first downlink data transmission to UE. The first DCI is transmitted on a first CORESET in a first CORESET group. The first CORESET group includes one or more CORESETs.

In the embodiment, the network device configures, through the second communication unit 51, multiple CORESET groups including the first CORESET group for the UE. That is, the first communication unit 41 of the UE receives the multiple CORESET groups configured by the network device and including the first CORESET group.

Specifically, the network device may configure, through the second communication unit 51, one or more CORESET groups for the UE. Configuration of the multiple CORESET groups is emphasized in the embodiment.

Different CORESET groups in the multiple CORESET groups may correspond to different TRPs/panels/beams. Therefore, different CORESET groups may be distinguished to further reduce the number of bits needed by part of indication information in the DCI.

The above multiple CORESETs or CORESET groups may correspond to the same BWP. In addition, different CORESET groups in the multiple CORESET groups are associated with different indexes.

There may also be another condition, namely the CORESET group is not associated with an ID. In such case, all CORESETs may be considered as belonging to the same CORESET group, and the CORESET group is not required to be configured.

In the embodiment, CORESETs in different CORESET groups may be configured by the same first signaling. In addition, CORESETs in different CORESET groups may also be configured by different signaling.

The same first signaling is the same PDCCH configuration signaling.

In an example, the number of CORESETs configured in the PDCCH-config (PDCCH configuration) signaling may maximally be 5, and of course, may also be larger or smaller, which are not exhaustive in the embodiment. If the number of the CORESETs in the PDCCH-config configuration is set to be less than or equal to 5, higher processing flexibility may be achieved, and the processing complexity may be reduced.

Whether the UE may support a combination of multiple CORESETs may be reported through a capability of the UE. Specifically, the first communication unit 41 may report whether the UE supports multiple CORESET groups through UE capability information. Correspondingly, the network device may receive the UE capability information and determines whether the UE supports the multiple CORESET groups based on the UE capability information. The multiple CORESET groups may be configured for the UE if the UE supports the multiple CORESET groups. Otherwise, only one CORESET group is configured, or no CORESET group is configured.

The first communication unit 41 reports whether the UE supports the multiple CORESET groups on different bands of multiple bands through the UE capability information.

Or, the first communication unit 41 reports whether the UE supports the multiple CORESET groups on different band groups of multiple band groups through the UE capability information.

As described above, different CORESET groups in the multiple CORESET groups are associated with different indexes. Each CORESET in the same CORESET group may be associated with the same ID.

The ID is an ID of the CORESET group. The ID may be configured by the network device through Radio Resource Control (RRC) signaling or Media Access Control (MAC) Control Element (CE) signaling or indicated by information carried in a physical-layer channel or a physical-layer signal. As such, the concept of the ID of the CORESET group is introduced to further simplify the signaling. In addition, the ID may be configured more simply by RRC or a MAC CE, and higher system flexibility may be achieved by carrying information through the physical-layer signal.

The information carried in the physical-layer channel or the physical-layer signal is indication information in DCI or an RNTI used for scrambling DCI.

In an example, different CORESET groups correspond to different ACK/NACK codebooks respectively. In such case, ACKs/NACKs corresponding to scheduling data of different CORESET groups may be transmitted independently, so that a non-ideal backhaul scene may be supported effectively.

In such case, IDs of different CORESET groups may not be set, or, IDs of the CORESET groups may also correspond to ACK/NACK codebooks, namely different IDs correspond to different ACK/NACK codebooks.

In addition, there is another condition that different CORESET groups may correspond to the same ACK/NACK codebook.

In an example, based on the above solution, the following operation may further be included in the embodiment.

The first communication unit 41 of the UE detects second DCI for scheduling second downlink data transmission, The second DCI is transmitted on a second CORESET in a second CORESET group.

In this manner, the UE may support the simultaneous transmission of multiple downlink data channels, so that the data transmission rate is improved.

Furthermore, the second DCI and the first DCI are used for scheduling respective corresponding first downlink channels respectively.

The first downlink channel may be a Physical Downlink Shared Channel (PDSCH).

In the embodiment, the first DCI corresponds to a first TCI state group, and/or the second DCI corresponds to a second TCI state group.

As such, different sending beams (or corresponding receiving beams) may be used when transmission of different PDSCHs by different TRPs/panels/beams is supported.

With respect to TCI states, the second communication unit 51 of the network device in an NR system may indicate a corresponding TCI state for a downlink signal or a downlink channel.

If the second communication unit 51 of the network device configures a QCL reference signal of a target downlink channel or a target downlink signal as a reference SSB or reference CSI-RS resource through a TCI state and a QCL type is configured as typeA, typeB or typeC, the UE may assume that large-scale parameters of the target downlink signal and the reference SSB or reference CSI-RS resource are the same. The large-scale parameter is determined by a QCL type configuration.

If the second communication unit 51 of the network device configures a QCL reference signal of a target downlink channel or downlink signal as a reference SSB or reference CSI-RS resource through a TCI state and a QCL type is configured as typeD, the UE may receive the target downlink signal using the same receiving beam (i.e., Spatial Rx parameter) for receiving the reference SSB or reference CSI-RS resource. Generally, the target downlink channel (or downlink signal) and the reference SSB or reference CSI-RS resource thereof are sent by the network device through the same TRP or the same panel or the same beam. Different TCI states may usually be configured if transmission TRPs or transmission panels or sending beams for two downlink signals or downlink channels are different.

For a downlink control channel, a TCI state corresponding to a CORESET may be indicated by RRC signal or a combination of RRC signaling and MAC signaling.

The first communication unit 41 of the UE receives one or more TCI state groups configured by a network for the UE, or, acquires one or more TCI state groups based on indication information.

The first TCI state group includes one or more TCI states.

The one or more TCI state groups correspond to the same BWP.

It is to be noted that, if there are multiple TCI state groups, each TCI state group may include multiple TCI states.

The number of TCI states included in a TCI state group may be not greater than N. N may be determined according to a practical condition. For example, N may be equal to 8.

TCI states in different TCI state groups of the one or more TCI state groups may be configured by the second communication unit 51 of the network device through the same second signaling. The second signaling may be PDSCH configuration signaling. In an example, the PDSCH configuration signaling may be RRC IE PDSCH-Config.

Furthermore, the first TCI state group may be determined by RRC signaling sent by the second communication unit 51 of the network device.

The TCI state groups may correspond to CORESET groups. For example, the first TCI state group corresponds to the first CORESET group bearing the first DCI. Alternatively, the first TCI state group corresponds to the first CORESET group.

In addition, the manner for determining the first TCI state group may be determined according to the first TCI state group. Specifically, the UE further includes a first processing unit 42, configured to determine the first TCI state group according to RRC signaling of the network device. Correspondingly, the second communication unit 51 of the network device configures the first TCI state group through the RRC signaling.

The first TCI state group corresponds to the first CORESET group.

The first TCI state group corresponds to the CORESET bearing the first DCI.

The first TCI state group may further be determined based on the first TCI state group in the following manners.

The first TCI state group may be a first TCI state group. Therefore, MAC CE signaling may be saved.

Alternatively, the first processing unit 42 selects and determines at least part of TCI states in the first TCI state group as the first TCI state group according to MAC CE signaling.

A maximum number of TCI states in the TCI state group may be determined according to a first capability of the UE. The first capability information of the UE may be reported to the network device by the UE. The UE may report the first capability information through third signaling. The third signaling may be maxNumberActiveTCI-PerBWP. In an example, the first capability is reported according to bands. That is, corresponding first capabilities may be reported independently for different bands or different band combinations.

Correspondingly, the first processing unit 42 or a second processing unit of the network device may determine the maximum TCI state number in one of the following manners.

The first capability reported by the UE is determined as the maximum TCI state number.

The first capability reported by the UE is divided by a maximum CORESET group number supported by the UE to obtain the maximum TCI state number.

The first capability reported by the UE is multiplied by the maximum CORESET group number supported by the UE to obtain the maximum TCI state number.

In addition, besides the above manner, the first TCI state group may also be determined in the following manners.

The first processing unit 42 of the UE determines one or more TCI states according to RRC configuration signaling, and selects at least part of TCI states in the one or more TCI states as the first TCI state group according to the MAC CE signaling.

As such, the system flexibility may be improved, and the overhead of the RRC signaling may be reduced.

Similar to the above, the first TCI state group may correspond to the first CORESET group. Alternatively, the first TCI state group may correspond to the CORESET group bearing the first DCI. In addition, a maximum value of TCI data may also be determined based on the first capability information as described above, which are not elaborated herein.

If the first TCI state group only includes the first TCI state, the first communication unit 41 of the UE receives the first downlink channel scheduled by the first DCI using the first TCI state or a QCL hypothesis corresponding to the first TCI state.

As such, the signaling overhead may be reduced, and meanwhile, a delay may be shortened.

In the NR system, the network device may indicate corresponding QCL state information to the UE through a TCI state when transmitting a downlink control channel or data channel.

The solution provided in the embodiment may include the followings.

In the first scheme, the first DCI includes first TCI state indication information, and the first TCI state indication information is configured to indicate a TCI state in the first TCI state group. As such, flexible and dynamic indication by DCI may be implemented, and the system performance may be improved.

Whether the first DCI may include the first TCI state indication information may be determined as follows.

The first processing unit 42 of the UE or the second processing unit of the network device determines that the first DCI includes the first TCI state indication information when a first condition is satisfied. As such, a related configuration is restricted to reduce the implementation complexity of the UE/network.

The first condition includes at least one of the followings.

The UE is configured with multiple TCI state groups.

The UE is configured with multiple TCI state groups, and TCI state information in the multiple TCI state groups includes QCL-TypeD information.

The UE is configured with multiple CORESET groups.

The UE is configured with multiple CORESET groups, and TCI state information in multiple TCI state groups includes QCL-TypeD information.

A format of the first DCI is DCI format 1_1, and a second condition is satisfied.

The second condition includes at least one of the followings.

The UE is configured with multiple TCI state groups.

The UE is configured with multiple TCI state groups, and TCI state information in the multiple TCI state groups includes QCL-TypeD information.

The UE is configured with multiple CORESET groups.

The UE is configured with multiple CORESET groups, and TCI state information in multiple TCI state groups includes QCL-TypeD information.

The first CORESET for transmitting the first DCI includes configuration signaling. The configuration signaling is configured to indicate whether the corresponding first DCI includes a TCI state indication field. For example, when the parameter tci-PresentInDCI in the first CORESET for transmitting the first DCI is set to "enabled", it indicates that the first DCI includes the TCI state indication field. In an example, when the parameter tci-PresentInDCI in the first CORESET for transmitting the first DCI is not configured, it indicates that the first DCI does not include a TCI state indication field.

In an example, a format of the first DCI is DCI format 1_1. In such case, the first TCI state may be indicated by determining the first TCI state indication information based on a content in a transmission configuration indication field of the first DCI. For example, the first TCI state indication information is indicated through the field "Transmission Configuration Indication" in the first DCI.

In an example, a scheduling time offset of DCI may be determined based on the following manner.

The first processing unit 42 of the UE or the second processing unit of the network device determines that the scheduling time offset of the first DCI is more than or not less than a first threshold when a third condition is satisfied.

The third condition includes at least one of the followings.

The UE is configured with multiple TCI state groups.

The UE is configured with multiple TCI state groups, and at least one TCI state information includes QCL-TypeD information.

The UE is configured with multiple CORESET groups.

The UE is configured with multiple CORESET groups, and at least one TCI state information includes QCL-TypeD information.

The above term "equal to" can be understood as approximately equal to or equal to the first threshold as expected by the UE.

As such, the DCI scheduling delay may be limited, and the implementation complexity of the UE/network may be reduced.

Furthermore, if the scheduling time offset of the first DCI is more than or not less than the first threshold, the first downlink channel scheduled by the first DCI is received using a TCI state indicated by the first DCI or a QCL hypothesis corresponding to the TCI state. The first downlink channel may be a PDSCH. Therefore, more flexible beam indication is implemented, so as to facilitate scheduling of the system on different beams and improve the system performance.

And/or, if the scheduling time offset of the first DCI is less than or not greater than the first threshold, the downlink channel scheduled by the first DCI is received using the same QCL hypothesis/TCI state as the second CORESET, or the downlink channel scheduled by the first DCI is received using the same QCL-TypeD related QCL hypothesis/TCI state as the second CORESET. Therefore, the scheduling delay is reduced, and user experiences of highly delay sensitive services are improved.

It is to be pointed out that the second CORESET may be a second CORESET determined from the first CORESET group corresponding to the DCI or a second CORESET determined from multiple CORESET groups.

The second CORESET may be a CORESET satisfying a fourth condition.

The fourth condition is that the second CORESET is a CORESET with a minimum ID in at least one CORESET of the first CORESET group detected on a first slot closest to the second downlink channel. The second downlink channel may be a PDCCH.

Specifically, the second CORESET may be a CORESET in the first CORESET group.

The UE detects the control channel on different slots. The UE detects at least one CORESET in the first CORESET group on the slot S1 (i.e., the first slot) closest to the PDSCH, and then selects a CORESET with a minimum CORESET-ID from the at least one CORESET as the second CORESET.

Alternatively, the second CORESET may be a CORESET satisfying a fifth condition. The fifth condition may be that the second CORESET is a CORESET with a minimum ID in at least one CORESET of multiple CORESET groups detected on a first slot closest to the second downlink channel. The second downlink channel may be a PDCCH. In addition, the multiple CORESET groups may be all CORESET groups configured presently.

Specifically, the second CORESET may be a CORESET in the multiple CORESET groups. A determination manner may be as follows. The UE detects the control channel on different slots at first. The UE detects at least one CORESET in the multiple CORESET groups on the slot S1 (i.e., the first slot) closest to the PDSCH, and selects a CORESET with a minimum CORESET-ID in the at least one CORESET as the second CORESET.

In an example, if all TCI states configured by the first processing unit 42 of the UE on a serving cell do not include "QCL-TypeD" or all TCI states in the first TCI state group do not include "QCL-TypeD", a QCL hypothesis/TCI state for receiving the downlink channel scheduled by the first DCI may use a TCI state indicated by the first DCI no matter whether the scheduling time offset of the first DCI is more than or not less than the first threshold.

If the first DCI schedules a multi-slot first downlink channel, the TCI state indicated by the first DCI is one of TCI states activated at a first slot in the scheduled multi-slot first downlink channel. In an example, the activated TCI state is kept unchanged on all corresponding slots of the scheduled multi-slot first downlink channel.

In an example, if QCL-TypeD information corresponding to the first downlink channel is different from that corresponding to the second downlink channel in correspondence with the first CORESET group and the first downlink channel overlaps with the second downlink channel in time domain, the second downlink channel is received at first.

The first downlink channel is a PDSCH. The second downlink channel is a PDCCH.

Furthermore, the first communication unit of the UE receives the first downlink channel scheduled by the first DCI using a TCI state indicated by the first DCI or a QCL hypothesis corresponding to the TCI state when a sixth condition is satisfied.

The sixth condition includes at least one of the followings.

All TCI states on a scheduled BWP or serving cell include no QCL-TypeD related information.

TCI states in all TCI state groups on the scheduled BWP or serving cell include no QCL-TypeD related information.

TCI states in all TCI state groups on the scheduled BWP or serving cell do not include QCL-TypeD related information.

As such, a low-frequency system may be optimally designed, and the system performance may be improved.

If the first DCI schedules a multi-slot first downlink channel, namely the first DCI schedules a multi-slot PDSCH, the TCI state indicated by the first DCI is a TCI state activated at a first slot in the scheduled multi-slot PDSCH. The activated TCI state is kept unchanged on all slots corresponding to the scheduled multi-slot PDSCH.

In the embodiment, the first threshold is configured by the network device, or specified in a protocol, or determined by the network device for the UE based on the reported UE capability information. Determination of the first threshold based on the reported UE capability may support UEs with different capabilities.

When the first threshold is determined based on the reported UE capability, reporting may be independently performed based on different bands or band combinations. In an example, the capability of the UE may be reported through the parameter timeDurationForQCL.

In the second scheme, the first DCI includes no first TCI state indication information.

According to the scheme, a size of the DCI may be reduced, and the overhead may be reduced.

A format of the first DCI is DCI format 1_1. Therefore, the existing DCI format may be reused, the standardization workload may be reduced, and the implementation complexity of the UE and the network may be reduced.

Different from the previous manner, in the present manner, configuration signaling in the first CORESET for transmitting the first DCI does not indicate that the corresponding DCI includes a TCI state indication field.

As an example, the parameter tci-PresentInDCI in the first CORESET for transmitting the first DCI is not configured, or adopts a default value.

Alternatively, a format of the first DCI is DCI format 1_0. Therefore, the existing DCI format may be reused, the standardization workload may be reduced, and the implementation complexity of the UE and the network may be reduced.

In the present manner, the first processing unit 42 of the UE or the second processing unit of the network device determines that a scheduling time offset of the first DCI is more than or equal to a first threshold when a seventh condition is satisfied.

The seventh condition includes at least one of the followings.

The UE is configured with multiple TCI state groups.

The UE is configured with multiple TCI state groups, and at least one TCI state information includes QCL-TypeD information.

The UE is configured with multiple CORESET groups.

The UE is configured with multiple CORESET groups, and at least one TCI state information includes QCL-TypeD information.

Similarly, the term "equal to" may be approximately equal to or equal to as expected by the UE, namely infinitely close to the first threshold. As such, the DCI scheduling delay is limited, and the implementation complexity of the UE/network is reduced.

The first downlink channel scheduled by the first DCI is received using a TCI state or QCL hypothesis corresponding to the first CORESET bearing the first DCI if the scheduling time offset of the first DCI is more than or not less than the first threshold.

If the scheduling time offset of the first DCI is less than or equal to the first threshold, a PDSCH scheduled by the first DCI is received using the same QCL hypothesis as a third CORESET, or the PDSCH scheduled by the first DCI is received using the same QCL hypothesis corresponding to a QCL-TypeD as the third CORESET. Therefore, the scheduling delay may be reduced, and user experiences of highly delay sensitive services may be improved.

The third CORESET satisfies an eighth condition. The eighth condition is that the third CORESET is a CORESET with a minimum ID in at least one CORESET of the first CORESET group detected on a first slot closest to a second downlink channel.

Alternatively, the third CORESET satisfies a ninth condition. The ninth condition is that the third CORESET is a CORESET with a minimum ID in at least one CORESET of multiple CORESET groups detected on the first slot closest to the second downlink channel.

In an example, if QCL-TypeD information corresponding to the first downlink channel is different from that corresponding to the second downlink channel in correspondence with the first CORESET group and the first downlink channel overlaps with the second downlink channel in time domain, the second downlink channel is received at first.

The above method is suitable for single-carrier scheduling, and also suitable for intra-band CA (the PDSCH and the CORESET may correspond to different component carriers).

The first downlink channel scheduled by the first DCI is received using a TCI state indicated by the first DCI or a QCL hypothesis corresponding to the TCI state when a sixth condition is satisfied.

The sixth condition includes at least one of the followings.

All TCI states on a scheduled BWP or serving cell include no QCL-TypeD related information.

TCI states in all TCI state groups on a scheduled BWP or serving cell include no QCL-TypeD related information.

TCI states in all TCI state groups on a scheduled BWP or serving cell do not include QCL-TypeD related information.

As such, a low-frequency system may be optimally designed, and the system performance may be improved.

The first threshold is configured by the network, or specified in a protocol, or determined based on the reported UE capability. When the first threshold is determined based on the reported UE capability, the UE capability may be independently reported for different bands or different band combinations. In an example, the UE capability may be reported through the parameter timeDurationForQCL. As such, UEs with different capabilities may be supported.

It is finally to be noted that, in the embodiment, the multiple CORESET groups and the multiple TCI states correspond to a first BWP. Therefore, first downlink channel (PDSCH) scheduling in the same BWP may be supported.

The multiple CORESET groups correspond to a first BWP, and the TCI states correspond to a second BWP. The first BWP and the second BWP are the same BWP, so that PDSCH scheduling in the same BWP may be supported. Alternatively, the first BWP and the second BWP are different BWPs of the same serving cell, so that cross-BWP PDSCH scheduling may be supported.

And/or, the multiple CORESET groups and the multiple TCI states correspond to a first serving cell/carrier. Therefore, PDSCH scheduling in the same serving cell may be supported.

And/or, the multiple CORESET groups correspond to a first serving cell/carrier, the TCI states correspond to a second serving cell/carrier, and the first serving cell/carrier and the second serving cell/carrier are different serving cells/carriers. Therefore, cross-carrier scheduling of the first downlink channel, i.e., the PDSCH, may be supported.

At least one search space configuration corresponding to at least one CORESET supports cross-carrier scheduling.

And/or, DCI born in at least one CORESET includes a BWP ID indication field.

In the above solution, the UE expects that a scheduling time offset of the DCI is equal to or not less than the first threshold if a TCI state includes "QCL-TypeD" information. The term "equal to" can be understood as approximately equal to or equal to as expected by the UE. The first threshold is configured by the network, or specified in the protocol, or determined based on the reported UE capability. When the first threshold is determined based on the reported UE capability, reporting may be performed through the parameter timeDurationForQCL, to support UEs with different capabilities.

The UE feeds back Hybrid Automatic Repeat reQuest (HARQ) related information through a corresponding ACK/NACK codebook according to a detection condition of the PDSCH scheduled by the first DCI. For example, the UE may feed back corresponding HARQ information through ACK/NACK codebook 0 according to a detection condition of a first PDSCH scheduled by the first DCI. The UE feeds back corresponding HARQ information through ACK/NACK codebook 1 according to a detection condition of a second PDSCH scheduled by the second DCI.

With the above solutions, corresponding DCI may be received on a CORESET in a corresponding CORESET group, thereby associating the DCI with different CORESET groups. As such, control resources are distinguished to distinguish different downlink data, thereby improving the system performance. In addition, such a processing manner is more suitable for the transmission of downlink data through multiple TRPs, or multiple panels or multiple beams.

FIG. 11 is a schematic structure diagram of a communication device 600 according to an embodiment of the disclosure. The communication device in the embodiment may specifically be the network device or terminal device in the above embodiments. The communication device 600 illustrated in FIG. 11 includes a processor 610. The processor 610 may call and run a computer program in a memory to implement the method in the embodiments of the disclosure.

In an example, as illustrated in FIG. 11, the communication device 600 may further include a memory 620. The processor 610 may call and run the computer program in the memory 620 to implement the method in the embodiments of the disclosure.

The memory 620 may be a separate device from the processor 610, or may be integrated into the processor 610.

In an example, as illustrated in FIG. 11, the communication device 600 may further include a transceiver 630. The processor 610 may control the transceiver 630 to communicate with another device, specifically to send information or data to the other device or receive information or data sent by the other device.

The transceiver 630 may include a transmitter and a receiver. The transceiver 630 may further include antennae. The number of the antennae may be one or more.

In an example, the communication device 600 may specifically be the network device of the embodiments of the disclosure. The communication device 600 may implement corresponding flows implemented by the network device in each method of the embodiments of the disclosure, which will not be elaborated herein for brief description.

In an example, the communication device 600 may specifically be the terminal device or network device of the embodiment of the disclosure. The communication device 600 may implement corresponding flows implemented by the mobile terminal/terminal device in each method of the embodiments of the disclosure, which will not be elaborated herein for brief description.

Figure 12:
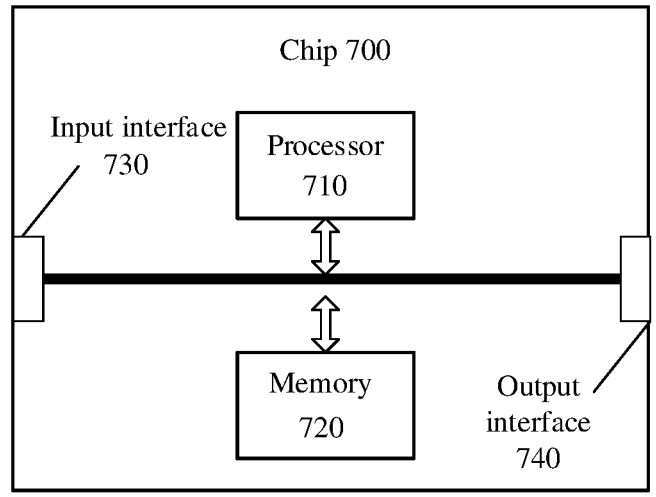
FIG. 12 is a schematic block diagram of a chip according to an embodiment of the disclosure.

FIG. 12 is a schematic structure diagram of a chip according to an embodiment of the disclosure. The chip 700 illustrated in FIG. 12 includes a processor 710. The processor 710 may call and run a computer program in a memory to implement the method in the embodiments of the disclosure.

In an example, as illustrated in FIG. 12, the chip 700 may further include a memory 720. The processor 710 may call and run the computer program in the memory 720 to implement the method in the embodiments of the disclosure.

The memory 720 may be a separate device from the processor 710 and may also be integrated into the processor 710.

In an example, the chip 700 may further include an input interface 730. The processor 710 may control the input interface 730 to communicate with another device or chip, specifically to acquire information or data sent by the other device or chip.

In an example, the chip 700 may further include an output interface 740. The processor 710 may control the output interface 740 to communicate with the other device or chip, specifically to output information or data sent by the other device or chip.

In an example, the chip may be applied to the network device of the embodiments of the disclosure, and the chip may implement corresponding flows implemented by the terminal device in each method of the embodiments of the disclosure, which will not be elaborated herein for brief description.

It is to be understood that the chip in the embodiment of the disclosure may also be called a system-level chip, a system chip, a chip system, a system on chip, or the like.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logic device, a discrete gate or transistor logic device, and a discrete hardware component. Each method, operation, and logical block diagram disclosed in the embodiments of the disclosure may be implemented or executed. The universal processor may be a microprocessor, or the processor may be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory. The processor reads information in the memory and completes the operations of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

Figure 13:
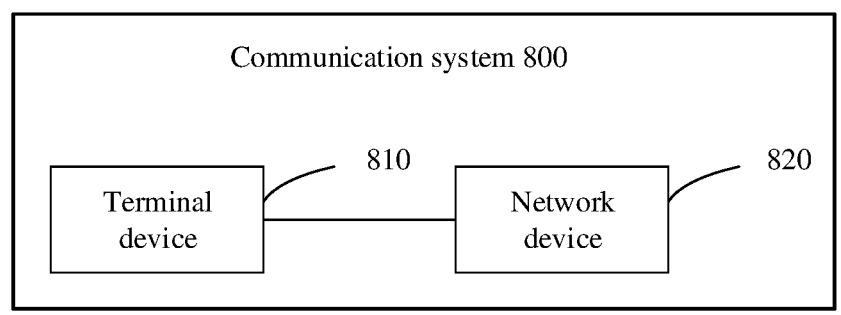
FIG. 13 is a second schematic diagram of an architecture of a communication system according to an embodiment of the disclosure.

FIG. 13 is a schematic block diagram of a communication system 800 according to an embodiment of the disclosure. As illustrated in FIG. 13, the communication system 800 includes a terminal device 810 and a network device 820.

The terminal device 810 may be configured to implement the corresponding functions implemented by the UE in the above methods, and the network device 820 may implement the corresponding functions implemented by the network device in the above methods. Details will not be elaborated herein for brief description.

An embodiment of the disclosure also provides a computer-readable storage medium, which is configured to store a computer program.

In an example, the computer-readable storage medium may be applied to a network device or terminal device in the embodiments of the disclosure. The computer program enables a computer to execute corresponding flows implemented by the network device in each method of the embodiments of the disclosure. Details will not be elaborated herein for brief description.

An embodiment of the disclosure also provides a computer program product, which includes a computer program instruction.

In an example, the computer program product may be applied to a network device or terminal device in the embodiments of the disclosure. The computer program instruction enables a computer to execute corresponding flows implemented by the network device in each method of the embodiments of the disclosure. Details will not be elaborated herein for brief description.

An embodiment of the disclosure also provides a computer program.

In an example, the computer program may be applied to a network device or terminal device in the embodiments of the disclosure, and runs in a computer to enable the computer to execute corresponding flows implemented by the network device in each method of the embodiments of the disclosure. Details will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, device, and unit described above may refer to the corresponding processes in the method embodiments and will not be elaborated herein for convenient and brief description.

In some embodiments provided by the disclosure, it is to be understood that the disclosed system, device, and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, namely they may be located in the same place, or may be distributed to multiple network units. Part or all of the units may be selected to achieve the purposes of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An information processing method, applied to a User Equipment (UE) and comprising:
   receiving, by the UE, first Downlink Control Information (DCI) used for scheduling first downlink data transmission,
   wherein the first DCI is transmitted on a first Control Resource Set (CORESET) in a first CORESET group, the first CORESET group comprises one or more CORESETs, and CORESETs in different CORESET groups are configured by a same Physical Downlink Control Channel (PDCCH) configuration signaling;
   wherein the method further comprises:
   detecting, by the UE, second DCI for scheduling second downlink data transmission, wherein the first DCI corresponds to a first Transmission Configuration Indicator (TCI) state group and the second DCI correspond to a second TCI state group, the first TCI state group corresponds to the first CORESET bearing the first DCI and TCI states in the TCI state groups are configured by a same Physical Downlink Shared Channel (PDSCH) configuration signaling;
   wherein the first DCI comprises no first TCI state indication information, and the method further comprises:
   receiving a first downlink channel scheduled by the first DCI using a TCI state or Quasi co-location (QCL) hypothesis corresponding to the first CORESET responsive to that a scheduling time offset of the first DCI is more than or not less than a first threshold;
   responsive to that the scheduling time offset of the first DCI is less than or equal to the first threshold, receiving a PDSCH scheduled by the first DCI using a same QCL hypothesis as a third CORESET, or receiving the PDSCH scheduled by the first DCI using a same QCL-TypeD related QCL hypothesis as the third CORESET, wherein the third CORESET is different from the first CORESET.

2. The method of claim 1, wherein the second DCI is transmitted on a second CORESET in a second CORESET group.

3. The method of claim 1, wherein the first TCI state group comprises one or more TCI states.

4. The method of claim 3, further comprising: receiving one or more TCI state groups configured by a network device for the UE; or, acquiring, by the UE, one or more TCI state groups based on indication information.

5. The method of claim 4, wherein the one or more TCI state groups correspond to a same BandWidth Part (BWP).

6. The method of claim 1, wherein the first TCI state group corresponds to the first CORESET group.

7. The method of claim 1, further comprising:
determining one or more TCI states according to Radio Resource Control (RRC) configuration signaling; and
selecting at least part of TCI states in the one or more TCI states as the first TCI state group according to Media Access Control (MAC) Control Element (CE) signaling.

8. The method of claim 1, wherein a format of the first DCI is DCI format 1_1 or DCI format 1_0.

9. The method of claim 1, further comprising:
determining that configuration signaling in the first CORESET for transmitting the first DCI does not indicate that the corresponding DCI comprises a TCI state indication field.

10. The method of claim 1, wherein the TCI state indication field in the first CORESET for transmitting the first DCI is not configured, or adopts a default value.

11. The method of claim 1, wherein the third CORESET satisfies a condition; and the condition is that the third CORESET is a CORESET with a minimum identifier (ID) in at least one CORESET of the first CORESET group detected on a first slot closest to a second downlink channel.

12. The method of claim 11, wherein the third CORESET satisfies another condition; and
the another condition is that the third CORESET is a CORESET with a minimum ID in at least one CORESET of multiple CORESET groups detected on the first slot closest to the second downlink channel.

13. User Equipment (UE), comprising:
a first transceiver, configured to receive first Downlink Control Information (DCI) used for scheduling first downlink data transmission,
wherein the first DCI is transmitted on a first Control Resource Set (CORESET) in a first CORESET group, the first CORESET group comprises one or more CORESETs, and CORESETs in different CORESET groups are configured by a same Physical Downlink Control Channel (PDCCH) configuration signaling;
wherein the first transceiver is configured to detect second DCI for scheduling second downlink data transmission, wherein the first DCI corresponds to a first Transmission Configuration Indicator (TCI) state group and the second DCI correspond to a second TCI state group, the first TCI state group corresponds to the first CORESET bearing the first DCI and TCI states in the TCI state groups are configured by a same Physical Downlink Shared Channel (PDSCH) configuration signaling;
wherein the first DCI comprises no first TCI state indication information, and the first transceiver is configured to:
receive a first downlink channel scheduled by the first DCI using a TCI state or Quasi co-location (QCL) hypothesis corresponding to the first CORESET responsive to that a scheduling time offset of the first DCI is more than or not less than a first threshold;
responsive to that the scheduling time offset of the first DCI is less than or equal to the first threshold, receive a PDSCH scheduled by the first DCI using a same QCL hypothesis as a third CORESET, or receive the PDSCH scheduled by the first DCI using a same QCL-TypeD related QCL hypothesis as the third CORESET, wherein the third CORESET is different from the first CORESET.

14. The UE of claim 13, wherein the second DCI is transmitted on a second CORESET in a second CORESET group.

15. The UE of claim 13, wherein the first TCI state group comprises one or more TCI states;
wherein the first transceiver is configured to:
receive one or more TCI state groups configured by a network for the UE,
or, acquire one or more TCI state groups based on indication information.

16. The UE of claim 15, wherein the one or more TCI state groups correspond to a same BandWidth Part (BWP).

17. The UE of claim 13, wherein the first TCI state group is determined based on received Radio Resource Control (RRC) signaling.

18. The UE of claim 13, further comprising: a first processor, configured to determine one or more TCI states according to RRC configuration signaling and select at least part of TCI states in the one or more TCI states as the first TCI state group according to Media Access Control (MAC) Control Element (CE) signaling.

19. A network device, comprising:
a transceiver, configured to send first Downlink Control Information (DCI) used for scheduling first downlink data transmission to User Equipment (UE),
wherein the first DCI is transmitted on a first Control Resource Set (CORESET) in a first CORESET group, the first CORESET group comprises one or more CORESETs, and CORESETs in different CORESET groups are configured by a same Physical Downlink Control Channel (PDCCH) configuration signaling;
wherein the transceiver is configured to send second DCI used for scheduling second downlink data transmission, wherein the first DCI corresponds to a first Transmission Configuration Indicator (TCI) state group and the second DCI correspond to a second TCI state group, the first TCI state group corresponds to the first CORESET bearing the first DCI and TCI states in the TCI state groups are configured by a same Physical Downlink Shared Channel (PDSCH) configuration signaling;
wherein the first DCI comprises no first TCI state indication information, and the transceiver is configured to:
send a first downlink channel scheduled by the first DCI using a TCI state or Quasi co-location (QCL) hypothesis corresponding to the first CORESET responsive to that a scheduling time offset of the first DCI is more than or not less than a first threshold;
responsive to that the scheduling time offset of the first DCI is less than or equal to the first threshold, send a PDSCH scheduled by the first DCI using a same QCL hypothesis as a third CORESET, or send the PDSCH scheduled by the first DCI using a same QCL-TypeD related QCL hypothesis as the third CORESET, wherein the third CORESET is different from the first CORESET.

20. The network device of claim 19, wherein the second DCI is transmitted on a second CORESET in a second CORESET group.

* * * * *